United States Patent [19]
Schold

[11] 3,802,633
[45] Apr. 9, 1974

[54] APPARATUS FOR DISPERSING FINELY DIVIDED SOLID PARTICLES IN A LIQUID VEHICLE

[76] Inventor: George R. Schold, 7909 2nd St. North, St. Petersburg, Fla. 32507

[22] Filed: Feb. 7, 1972

[21] Appl. No.: 224,140

[52] U.S. Cl. .................................. 241/72, 241/172
[51] Int. Cl. .................................. B02c 17/16
[58] Field of Search ........ 241/46.02, 46.17, 62, 74, 241/69, 72, 79, 172, DIG. 7

[56] References Cited
UNITED STATES PATENTS
3,311,310  3/1967  Engels .............................. 241/172
3,640,476  2/1972  Engels .............................. 241/74
3,486,705  12/1969  Szegvari ........................... 241/172

Primary Examiner—Donald G. Kelly
Assistant Examiner—Robert C. Watson

[57] ABSTRACT

A continuous duty, fully enclosed apparatus for deagglomerating solid, insoluble particles such as pigments and for uniformly distributing and dispersing the particles in a liquid vehicle which involves the utilization of a dispersing media such as steel shot which is retained in a generally cylindrical mixing vessel and agitated by impellers or agitator discs connected to a drive shaft. The apparatus utilizes a flow disruptor means disposed at the upper end of the apparatus to assist in separating the dispersing media from the processed product and returning the dispersing media to its normal work area.

6 Claims, 3 Drawing Figures

APPARATUS FOR DISPERSING FINELY DIVIDED SOLID PARTICLES IN A LIQUID VEHICLE

BACKGROUND OF THE INVENTION

This invention relates to an apparatus for uniformly producing finely divided particles and uniformly distributing such finely divided particles in a liquid vehicle.

The invention herein is an improvement to the apparatus disclosed in my co-pending application for U.S. Pat., Ser. No. 845,223, filed July 28, 1969 now U.S. Pat. No. 3,653,600, but may have wider application in other apparatus of this general character.

Because there is a tendency in this type of apparatus for the combination of the centrifugal forces exerted and the rate of flow into the vessel of the material being processed to cause the dispersing media to flow upwardly and concentrate in the upper portion of the vessel, it becomes necessary to provide a flow disruptor which is effective to direct the dispersing media back into the central portion of the vessel where the dispersing media may be more effectively used.

In apparatus of the type disclosed herein, it is advantageous that the dispersing media such as metal shot, sand or glass beads for example, used to disperse the pigment in the liquid vehicle, be retained in the lower part of the mixing vessel. This is so because the greater the density of the dispersing media in the lower part of the vessel the better it will perform the function of finely dividing particles in the mixture being processed.

At the upper end of the apparatus shown herein, a rotor separator is disposed close to the outlet of the vessel and lies in the path of flow between the inlet and the outlet. It is advantageous to remove the dispersing media from the vicinity of the rotor separator. This is also true in an apparatus of the type using a screen separating member positioned near the outlet and substantially co-extensive with the mixing vessel wall as illustrated in my U. S. Pat. No. 3,135,474. This is true whether the mill having such an outwardly positioned screen separator member is of the open type as disclosed in my U. S. Pat. No. 3,135,474 or of the sealed type.

SUMMARY OF THE INVENTION

Accordingly, it is a primary object of this invention to provide stationary flow disruptor means disposed in the upper end of the vessel to direct dispersing media back into the liquid product being processed.

Another object is to provide in the vicinity of the dispersing media separator means stationary flow disruptor means in the form of helicoid means to protect the separator, scavenger port and sealing means against excessive dispersing media movement by directing the dispersing media tending to come within the vicinity of the separator back into the lower portion of the vessel.

Other objects and advantages of this invention will become more readily apparent when considered in connection with the following drawing.

BRIEF DESCRIPTION OF THE DRAWING

FIG. 3 is a partial cutaway view in elevation of apparatus incorporating a plurality of helicoid members.

DESCRIPTION OF THE PREFERRED EMBODIMENT

Figure 1:
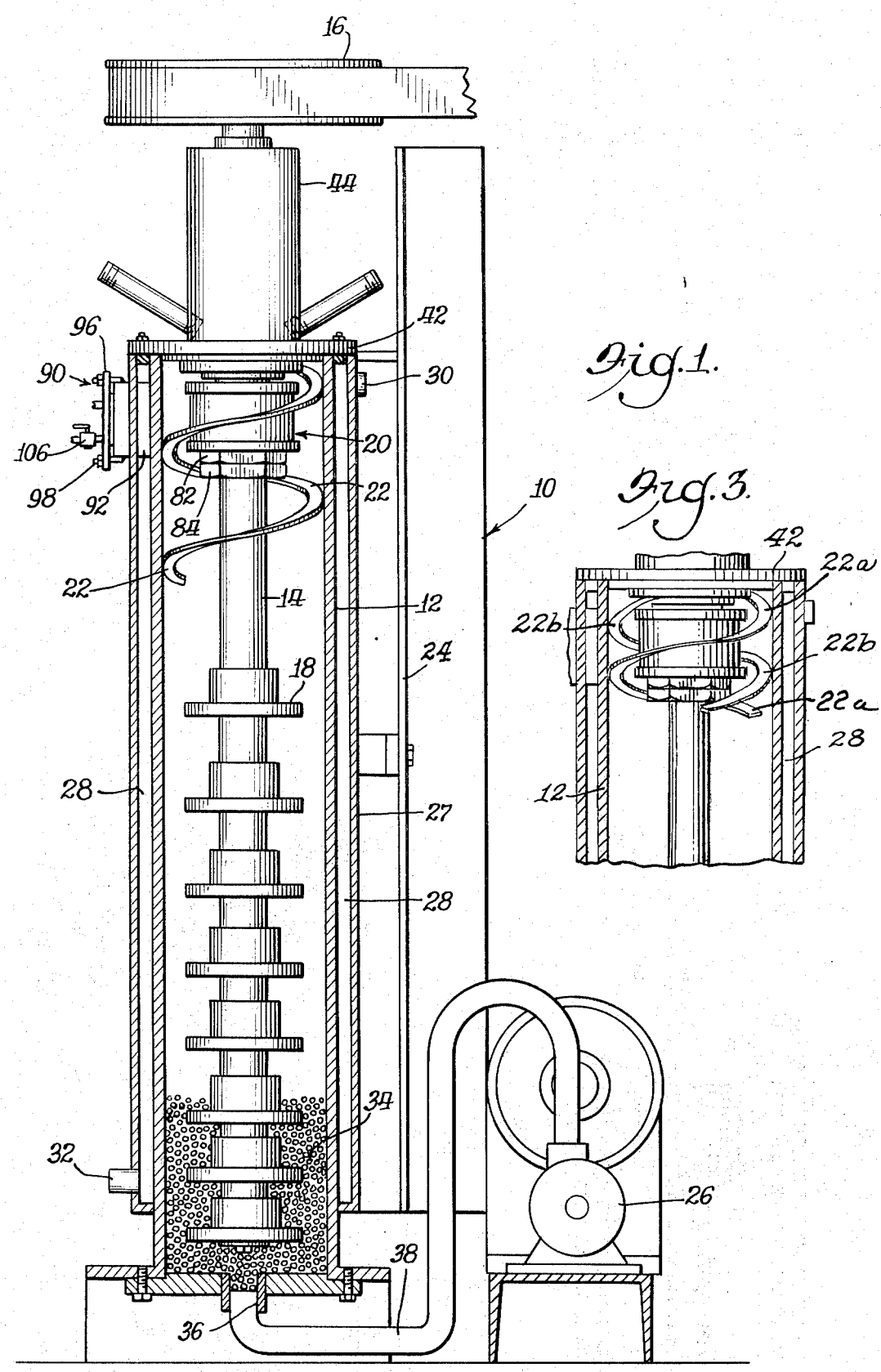
FIG. 1 is a cut-away view in elevation of apparatus embodying the present invention.
Figure 2:
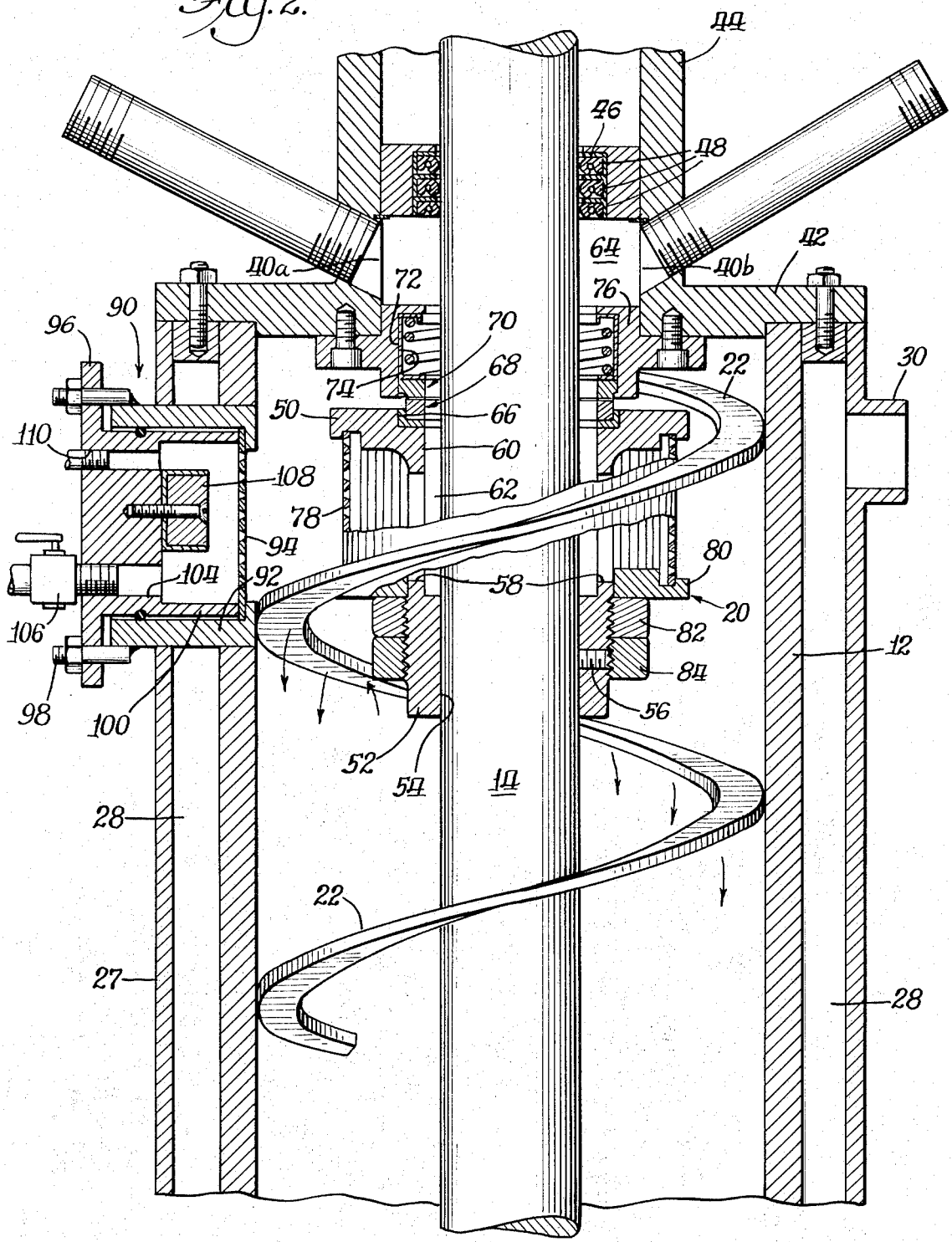
FIG. 2 is an enlarged sectional view in elevation of the upper section of the apparatus of FIG. 1 showing the rotor separator and the helicoid member associated therewith.

Referring now to the drawings wherein like reference characters in the several views designate similar parts, 10 designates generally the dispersing apparatus or mill embodying the invention herein. The dispersing apparatus comprises a generally cylindrical mixing vessel 12, a rotatable agitator shaft 14, a belt and pulley drive unit 16 (shown in part) for driving the shaft 14, a plurality of impellers or agitators 18 mounted on the shaft 14, a rotor separator 20 secured to the shaft 14 and a helicoid member 22. The vessel 12 and drive unit 16 usually are mounted on a suitable supporting frame 24. A pump 26 is associated with the mill to introduce premixed material into the vessel 12 to be processed. A circumferential jacket 27 is radially spaced from the vessel 12 to form therewith a chamber 28 through which a temperature controlling fluid may be circulated by means of inlet and outlet connections 30 and 32 at upper and lower ends of the chamber 28.

The vessel is partially filled with a dispersing media 34 such as steel shot, for example, but other types of dispersing media can also be used. When steel shot is used the vessel preferably is filled only about half way.

In the illustrated embodiment the vessel 12 is closed at both its upper and lower ends and inlet 36 is formed in the lower end of the vessel through which product to be processed is pumped from pump 26 via conduit 38. Outlet means are disposed at the upper end of the vessel and may be in the form of two outlets 40a and 40b. A cover plate 42 secured to the upper end of the vessel closes the upper end of the vessel. The cover plate may be formed as an integral part of the shaft bearing housing 44. The cover may be secured to the top of the vessel 12 by suitable means such as bolts and may be constructed so as to form the upper end closure for the cylindrical chamber 28 surrounding the vessel 12. The shaft 14 is rotatably supported in the axially extending bearing housing 44 in a conventional manner as disclosed in my above referred to co-pending application Ser. No. 845,223. Secondary sealing means 46 which may comprise spring biased lip seals 48 of conventional construction are disposed around shaft 14 just above the outlet means and just below a lower shaft bearing (not shown). The drive unit 16 may be of the type disclosed in the above mentioned co-pending U. S. application Ser. No. 845,223.

The rotor separator 20 also may be of a type disclosed in the above referred to co-pending U. S. application Ser. No. 845,223 and as here shown comprises an annular member 50 formed with a hub portion 52 with a bore 54 for receiving the shaft 14 therethrough. One or more set screws 56 in the hub 52 secure the separator to the shaft. A plurality of circumferentially spaced openings or passageways 58 are formed in the wall of the separator. An enlarged bore portion 60 communicates with openings 58 and together with shaft 14 define a chamber 62 from which processed material flows upwardly to a discharge chamber 64.

A counterbore 66 in the upper portion of the separator forms a seat for a rotating face seal means 68 which rotates with the shaft 14 and separator 20. The seal means 68 cooperates with a stationary face seal assembly 70 attached to a stationary spring and case assembly 72 which is positioned and supported in a bore 74 formed in a stationary seal gland 76. The latter is secured to the cover plate 42 by suitable means such as bolts.

A filter means 78 comprising a conventional screen member of a selected mesh is positioned on the outer periphery of the separator. It may be held in place by a ring-like flange member 80 which slides over the hub and is held in place by a pair of lock nuts 82 and 84 screwed onto the hub 52.

A scavenger port 90 is provided in the upper end of the mill 10 extending through both the vessel 12 and jacket 27. Its purpose is to collect small particles of dispersing media that may break off from the media being used. These small particles are sometimes referred to as "fines." The scavenger port may be defined by a small tubular member 92 extending through and secured in the vessel 12 and jacket 27. A screen filter member 94 of predetermined mesh is secured in place at the inner end of the tubular member 92. The port is closed by a removable cover plate 96 which may be secured in place by nut and bolt means 98 or other suitable means. The cover plate 96 may be formed with a tubular extension 100 which slides into the tubular member 92 and up against the screen member 94 to help hold the screen in place. O-ring seal means 98 may be disposed on the extension 97 to provide an adequate seal. It will be apparent that as processed material is moved into the upper part of the mill and centrifugal force tends to throw the dispersing media outwardly, fines of such size as are capable of passing through screen 94 will do so and collect in the scavenger port 90 until removed. A discharge port 104 in the cover plate 96 may be fitted with a small valve 106 to allow flushing of the scavenged materials at selected intervals. When steel shot or other magnetically susceptible material is used as the dispersing media, a small magnet 108 attached to the inside of the cover plate further assists in removing "fines" from the dispersing media. Opening 110 may be provided in the cover plate as a convenient location for a pressure gauge.

It will be observed that the port 90 is located substantially opposite the rotor separator 20. Thus the port 90 may be used as an inspection port to view the rotor separator when the cover plate 96 and screen 94 are removed.

The helicoid member 22 is positioned at the upper end of the vessel 12. The upper end of the helicoid member is positioned adjacent and is attached to the cover plate 42 by suitable means such, for example, as bolt means (not shown). The helicoid member is in the form of a spirally shaped metal plate in strip-like form which fits snugly against the inner wall of the mixing vessel. It may extend down to a position slightly above the uppermost agitator disc 18.

The purpose of the helicoid member is to return the dispersing media such as metal shot back into the mixture as it tends to rise in the vessel with the mixture being processed. The viscosity of the product being processed and the rate at which the product is being fed into and through the mill are factors which affect the tendency of the dispersing media to rise into the upper end of the mill. With an extremely viscous product it is not uncommon for a substantial amount of the dispersing media to "float" and rise to the upper end of the mill. This happens to the extent that a substantial amount of the dispersing media tends to pack the upper end of the mill. It will be apparent that such a condition is not desirable for a number of reasons. The steel shot dispersing media tends to batter the rotor separator 20 and filter screen 78 thereon as well as the filter screen 94 on the scavenger port. In addition the availability of a large portion of the dispersing media is lost to the lower part of the vessel so that it cannot perform its deagglomerating function. The helicoid member is effective to prevent an excessive amount of dispersing media from moving up into the vicinity closely adjacent the rotor separator member and the filter screen 78 positioned on the outside thereof is substantially lessened. In addition possible damage to the filter screen or the scavenger port is limited. Furthermore, a more effective use is made of the dispersing media by deflecting it back down into the middle and lower portion of the vessel where it is adapted to perform more efficiently than it would by tending to float around in the upper portion of the vessel and liquid product which at that point has already been substantially processed.

While the helicoid member herein illustrated has approximately two full turns, the number of turns may be of a greater or lesser number. In addition, it is possible that a plurality of helicoid members be used; for example, two or three helicoid members each attached to the cover plate 42 and circumferentially spaced from each other may be used. This is shown in FIG. 3, the helicoid members being shown as 22a and 22b. In such case each of the helicoid members preferably are made up of something less than one turn. A single strip extending less than the full circumference of the vessel and disposed at an angle along the vessel wall also may be used.

Although the helicoid member is here shown as a strip of substantially uniform width, it should be noted that the lower portion below the rotor separator 20 may be of greater width than the upper portion. It may be wide enough to bring it closely adjacent the rotating shaft 14 leaving only a small space between the inner edge of the helicoid member and the shaft, sufficient to permit the product being processed to move upwardly toward the rotor separator and the outlet. It will be apparent that such a construction will further restrict the upward movement of the dispersing media.

The general operation of the dispersing apparatus disclosed herein is similar to that disclosed in my above mentioned co-pending U. S. application Ser. No. 845,223. Dispersing media is introduced into the vessel 12 through a suitable opening (not shown) provided in the cover plate, for example. The vessel may be filled with dispersing media up to a point approximately one half the height of the vessel. Sometimes less can be used but generally more is not required. Temperature control fluid is circulated through the chamber 28. Premixed material including a liquid vehicle and agglomerated pigments, for example, is fed from a storage tank (not shown) to the pump 26 which forces the material under pressure through conduit 38 and through inlet 36 into the vessel 12. The premixed material is forced up through the dispersing media while the media is being agitated by rotation of the shaft 14 and the agitator 18 associated therewith. The pump functions to create a pressure differential between the inlet to and outlet from the vessel, and the premixed material is moved through the vessel at a controlled rate of flow. It will be appreciated that it is within the scope of the invention herein to use other means than a pump for creating the requisite pressure differential such, for example, as a controlled gravity feed. As the product being processed is moved upwardly through the vessel, pigment particles are deagglomerated and dispersed throughout the liquid vehicle. As the mixed product reaches the upper portion of the mill, the dispersing media, which is heavier than the mixed product, tends to be thrown outwardly toward the wall of the mixing vessel. The processed material is forced under pressure to flow through the filter screen 78 and radially inwardly through the openings 58 of the rotor separator 20 to the chamber 62, and into discharge chamber 64 and then through the outlet means 40a and 40b.

The centrifugal force on the dispersing media resulting from the rotation of the shaft and agitator discs, of course, tends to throw the dispersing media outwardly toward the wall of the mixing vessel. In the embodiment illustrated the shaft 14 rotates clockwise looking downwardly on the shaft. It will be observed that the spiral formation of the helicoid member is also in a clockwise manner looking downwardly. In view of the clockwise rotation of the shaft and the angle at which the helicoid member is positioned the swirling action causes the dispersing media to be deflected downwardly into the central portion of the mixing vessel when it hits the underside of the helicoid member.

It will be apparent that I have advantageously provided flow disruptor means in the upper portion of the described apparatus which is effective to protect the rotor separator and the screen filter positioned on the outer periphery thereof and the scavenger port screen filter means from undesirable dispersing media in that area. In addition the rotating and stationary seal means are also protected from the harmful effects of an excessive concentration of dispersing media.

These same advantages of the use of a helicoid member as herein disclosed would be achieved in an apparatus which uses a screen separator mounted toward the outer periphery of the vessel. And this would be true whether the apparatus is an open or sealed type mill.

While a preferred embodiment of the invention has been disclosed, it will be appreciated that this is shown by way of example only, and the invention is not to be limited thereto. Other variations, some of which have been discussed, will be apparent to those skilled in the art, and the invention is to be given its fullest possible interpretation within the terms of the following claims.

I claim:

1. In apparatus for deagglomerating and dispersing solid particles held in agglomerated form and carried in suspension in a liquid vehicle by the action of a dispersing media on the solids the combination comprising:
    a mixing vessel having a fluid inlet at the bottom thereof and a fluid outlet in the upper portion thereof, said vessel being adapted to have a charge of dispersing media introduced thereinto, said inlet being adapted to be operatively connected to means for introducing a fluid mixture into said inlet and through the dispersing media to said outlet;
    a rotating shaft extending into said vessel and adapted to be driven from a power source;
    a rotor separator for separating dispersing media from the fluid mixture, said rotor separator being operatively associated with said shaft to be rotatably driven thereby and disposed in the path of flow between said vessel inlet and outlet;
    agitating means operatively associated with said shaft within said vessel for agitating the dispersing media;
    a stationary flow disruptor member disposed at the upper end of said vessel adjacent the mixing vessel wall and surrounding said rotor separator and extending to substantially the uppermost portion of the vessel to prevent concentration of dispersing media in the upper portion of said mixing vessel.

2. The combination of claim 1 wherein
    said flow disruptor member comprises a flat strip attached to the uppermost portion of the mixing vessel and disposed at an angle along the mixing vessel wall in such a manner as to redirect upward movement of dispersing media which impinges against its underside back down into the central portion of the vessel.

3. The combination of claim 1 wherein
    said flow disruptor member comprises stationary helicoid means attached to the uppermost portion of the mixing vessel and is disposed closely adjacent the wall of the mixing vessel.

4. The combination of claim 3 wherein said helicoid means comprises a flat strip formed in a spiral shape the outer edge of which is disposed closely adjacent the wall of the mixing vessel.

5. The combination of claim 3 wherein
    said helicoid means comprises a plurality of circumferentially spaced substantially spiral segments.

6. In apparatus for deagglomerating and dispersing solid particles held in agglomerated form and carried in suspension in a liquid vehicle by the action of a dispersing media on the solids the combination comprising:
    a mixing vessel having a fluid inlet at the bottom thereof and a fluid outlet in the upper portion thereof, said vessel being adapted to have a charge of dispersing media introduced thereinto, said inlet being adapted to be operatively connected to means for introducing a fluid mixture into said inlet and through the dispersing media to said outlet;
    a rotating shaft extending into said vessel and adapted to be driven from a power source;
    a separator for separating dispersing media from the fluid mixture, said separator being operatively associated with said shaft and disposed in the path of flow between said vessel inlet and outlet;
    agitating means operatively associated with said shaft within said vessel for agitating the dispersing media;
    stationary helicoid flow disruptor means disposed at the upper end of said vessel adjacent the mixing vessel wall and surrounding said separator and extending to substantially the uppermost portion of said vessel to prevent concentration of dispersing media in the upper portion of said mixing vessel.

* * * * *